United States Patent [19]
Nagura et al.

[11] Patent Number: 4,927,682
[45] Date of Patent: May 22, 1990

[54] HEAT-RESISTANT FLOCK SHEET

[75] Inventors: Satoru Nagura, Tokyo; Tsutomu Ebihara; Toshihide Matsumoto, both of Tsuchiura, all of Japan

[73] Assignee: Toray Industries, Inc., Tokyo, Japan

[21] Appl. No.: 364,353

[22] Filed: Jun. 8, 1989

[30] Foreign Application Priority Data

Jun. 14, 1988 [JP] Japan ............................ 63-77799[U]

[51] Int. Cl.$^5$ ............................................. B32B 33/00
[52] U.S. Cl. ........................................ 428/88; 428/90; 428/95; 428/159; 428/160; 428/213; 428/215; 428/220
[58] Field of Search ................. 428/88, 90, 95, 159, 428/160, 172, 86, 213, 215, 220

[56] References Cited

U.S. PATENT DOCUMENTS 4,267,219  5/1981  Ueno et al. ............................ 428/90

Primary Examiner—Marion C. McCamish
Attorney, Agent, or Firm—Armstrong, Nikaido, Marmelstein, Kubovcik & Murray

[57] ABSTRACT

A heat-resistant flock sheet comprising a heat-resistant film layer consisting of an infusible organic polymer, a flock layer formed by flocking a number of short fibers on the surface of said heat-resistant film layer and a drawn film layer containing a lot of voids laminated on the surface of the opposite side to said flock layer on said heat-resistant film layer.

14 Claims, 2 Drawing Sheets

HEAT-RESISTANT FLOCK SHEET

BACKGROUND OF THE INVENTION

The present invention relates to a heat-resistant flock sheet and more specifically, the present invention relates to a heat-resistant flock sheet having a heat-resistant film layer as a base material and being capable of forming beautiful uneven patterns.

In recent years, flock sheets prepared by flocking short fibers are being widely used as interior decorative materials adhered on the inner walls of vehicles and buildings and outer decorative materials adhered on the outer surfaces of indoor interior items. It is required that the sheet materials used for the applications of these interior decorative materials and outer decorative materials should have heat resistance and flame resistance against fire such as fire of tobacco from the viewpoint of safety against fire. A flock sheet disclosed in Japanese Patent Application *Kokai* Publication No. 62-7469 is proposed as such a material that satisfies this requirement and is prepared by flocking short fibers on a heat-resistant sheet base material consisting of a polyimide film and the like by using a thermoplastic resin as an adhesive layer. On the other hand, as consumers' tastes have diversified, the monotonous appearance of such a flock sheet has become unfavorable for the flock sheets used in the above described outer decorative materials and interior decorative materials. As one of the effective means giving diversification to the appearance, it is proposed that uneven patterns are presented on the surface by emboss-treating the flock sheet. However, when a heat-resistant film layer such as polyimide film and the like is used, it is difficult to produce uneven patterns even if the emboss treatment is carried out at high temperature.

SUMMARY OF THE INVENTION

An object of the present invention is to provide a heat-resistant flock sheet wherein even though a heat-resistant film layer such as polyimide film and the like is used as a base material, uneven patterns can be easily formed.

A further object of the present invention is to provide a heat-resistant flock sheet wherein even though a heat-resistant film layer is used as a base material, uneven patterns can be easily formed not only under heating but also even at ambient temperature.

A still further object of the present invention is to provide a heat-resistant flock sheet wherein even though a heat-resistant film layer is used as a base material, uneven patterns can be easily formed by means of mechanical treatments such as a simple crumpling treatment and so on.

The flock sheet of the present invention for achieving the above described objects is characterized by comprising a heat-resistant film layer consisting of an infusible organic polymer, a flock layer formed by flocking a number of short fibers on the surface of said heat-resistant film layer and a drawn film layer having a plurality of voids laminated on the surface of the opposite side to the above described flock layer on the above described heat-resistant film layer. Moreover, for this flock sheet, it is also possible to laminate a flexible sheet on a surface of the above described drawn film layer being opposite side to the above described heat-resistant film layer, if necessary.

As the above described drawn film layer contains a plurality of voids, part of the voids can be squashed and permanent strain can be given by a crumpling treatment and the like at ambient temperature and uneven patterns can be formed on the surface by the permanent strain. As the above described flock sheet is prepared by laminating a heat-resistant film layer on this type of drawn film layer, the same uneven patterns can be given to the heat-resistant film layer by imparting uneven patterns on this drawn film layer.

DETAILED DESCRIPTION OF THE PREFERRED EMBODIMENTS

Figure 1:
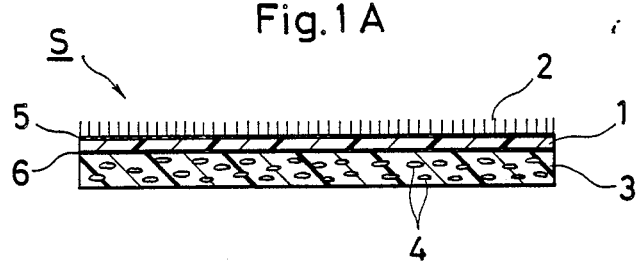
FIG. 1A is a vertical cross-sectional view illustrating a part of a flock sheet prepared by an Example of the present invention.
FIG. 1B is a vertical cross-sectional view illustrating a state where said flock sheet is mechanically treated and uneven patterns are thereon provided.
Figure 1:
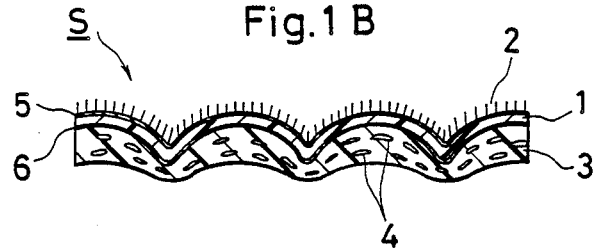

In FIG. 1A, S shows a flock sheet of the present invention. This flock sheet S has a heat-resistant film layer 1 consisting of an unfused organic polymer as one of the base materials and a flock layer 2 consisting of a plurality of short fibers is formed on one of the surfaces through an adhesive layer 5, and a drawn film layer 3 is formed on another surfaces through an adhesive layer 6. A plurality of voids are formed in the drawn film layer 3 and these voids are prepared by using particle-shaped fillers as the nuclei which are not illustrated in the figure.

Figure 2:
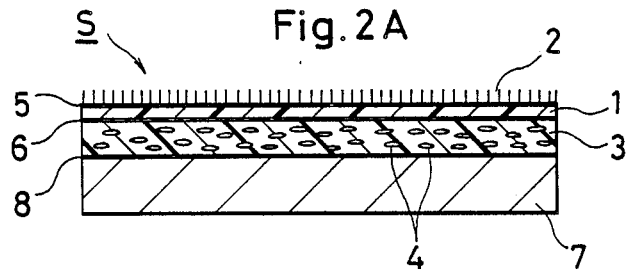
FIG. 2A is a vertical cross-sectional view illustrating a part of a flock sheet prepared by another Example of the present invention.
FIG. 2B is a vertical cross-sectional view illustrating a state where said flock sheet is mechanically treated and uneven patterns are thereon provided.
Figure 2:
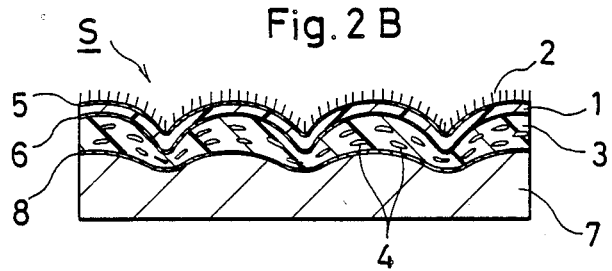

The flock sheets S thus formed can be used as it is in a laminated state as shown in FIG. 1A and furthermore, if necessary, it may be possible to laminate a flexible sheet layer 7 on the rear face of the drawn film layer 3 through an adhesive layer 8 as shown in FIG. 2A.

When a mechanical treatment such as a crumpling treatment, an embossing treatment and so on is applied on these flock sheets S of the present invention, voids 4 in the drawn film layer 3 are partly squashed to produce permanent strains and uneven patterns are formed like those shown in FIG. 1B for the sheet shown in FIG. 1A and like FIG. 2B for the sheet shown in FIG. 2A based on the permanent strains. Uneven strains generated in this drawn film layer 3 deforms a heat-resistant film layer being thereon integrally laminated and thereby forms the similar uneven patterns on the surface of the heat-resistant film layer 1.

In the flock sheets of the present invention, infusible organic polymers constituting the heat-resistant film layer are such synthetic polymers that have no melting point and decompose and are carbonized without melting when elevating temperature. As these infusible organic polymers, those which are carbonized at 400° C. or higher can be preferably used and more concretely, polyimides, polyamideimides, aromatic polyamides, polyparabanic acid and so on can be used.

The heat-resistant film layer can give a self-fire extinguishing property to the flock layer formed on the surface based on its heat resistance and even if the short fibers of said flock layer are flammable and ignited by burning tobacco and the like, the spread of fire can be prevented. This heat-resistant film layer also prevents the flame on the above described flock layer from spreading to the flexible sheet layer laminated on the opposite side of the flock layer.

Short fibers forming the flock layer in the flock sheets of the present invention are not specifically limited. Natural fibers such as cotton, linen, wool and so on, synthetic fibers such as polyester fibers, polyamide fibers, polyacrylonitrile fibers, polyolefin fibers and so on and artificial fibers such as rayon, acetate and so on can be used. Especially, those fibers which have flame-retardant property and heat-resistance such as polyvinylidene chloride fibers, modacrylic fibers, aromatic polyamide fibers, polyarylene fibers, phenol fibers and so on are preferable. Furthermore, it is preferable that these short fibers whose monofilament denier and fiber length are in the range of 1-20 denier and 1-10 mm are used.

Furthermore, as the flexible sheet layer, not only woven fabrics, knitted fabrics and non-woven fabrics consisting of natural fibers, synthetic fibers, artificial fibers and so on, or papers can be used, but also synthetic polymer films, synthetic polymer foamed sheet and so on can be also used if necessary.

In the flock sheet of the present invention, the drawn film layer contains a plurality of particle-shaped fillers and has a structure where voids are formed by the existence of the fillers acting as nuclei. The drawn film layer containing such voids can be prepared by drawing an undrawn synthetic polymer film where particle-shaped fillers are added.

As synthetic polymers used for this drawn film layer, polyolefin such as polypropylene, polyethylene and so on, polyesters, polyamides, polyvinyl chloride and so on can be used.

As particle-shaped fillers to be added in this drawn film layer, both inorganic and organic particles can be used. As the inorganic particles, calcium carbonate, magnesium carbonate, alumina, aluminum silicate, kaolin, kaolinite, talc, clay, diatomaceous earth, dalomite, titanium oxide, magnesium oxide, zeolite and so on can be cited. These inorganic particles can be used alone or by mixing two or more. As the organic particles, synthetic resin particles which are different from the synthetic polymer constituting the drawn film layer and have good peelability are used. For example, for the filler in polyester, polyolefin resins such as polyethylene, polypropylene, polymethyl pentene and so on can be cited. These organic particles are also used alone or by mixing two or more.

The amount of the above described filler to be added is preferably 10-40% by weight based on the synthetic polymer of the drawn film layer and more preferably 15-35%. If the added amount of the filler is less than 10% by weight, it becomes difficult to form uneven structures on the surface by means of a mechanical treatment such as a crumpling treatment and so on and if the added amount of the filler is more than 40% by weight, the drawn film layer becomes brittle and it tends to break when drawn.

As the drawing of undrawn synthetic polymer film, either monoaxial drawing in the longitudinal direction or biaxial drawing in both longitudinal and transverse directions can be used and the draw ratio may be such a degree that at least voids can be formed by the above described fillers acting as nuclei.

The content of voids included in the drawn film layer is preferably 25-60% by volume and more preferably 30-55% by volume. If the content of voids is less than 25% by volume, formation of uneven patterns prepared by means of mechanical treatment becomes insufficient and if this value is more than 60% by volume, uneven patterns are formed but the film layer becomes brittle and the mechanical strength decreases.

Here, the content of voids is defined by the following formula wherein density of the film containing voids is $\rho_0$ and density of the film where the voids are completely squashed by heat-pressing the film at a temperature close to the melting point of the film is $\rho$. In this case, density calculated from the weight and the volume (thickness X area) of the film is used.

$$\text{Content of voids (\% by volume)} = \frac{\rho - \rho_0}{\rho} \times 100$$

To give a desired content of voids within the above described range to the drawn film layer, the film forming conditions are properly selected. For example, to make the content of voids larger, either one or two or more of the conditions such as to enlarge the draw ratio, to elevate the drawing temperature or to increase the content of fillers are carried out.

It is not necessary that the distribution of voids in the drawn film layer is uniform in the thickness direction and it is preferred that the distribution of voids is smaller in the area close to the film surface and becomes larger inside. If voids largely are distributed on the surface of the drawn film layer adhesiveness of the surface tends to become insufficient and therefore peeling-off of the heat-resistant film layer and the flexible sheet layer occurs. However, to decreasing the content of voids to prevent this peeling-off causes a decrease in uneven pattern formability, which is the purpose of the present invention. Therefore, to prevent peeling-off and uneven pattern formability, it is preferable that a very thin film layer having no voids is laminated on at least one face of the drawn film layer containing voids.

Figure 3:
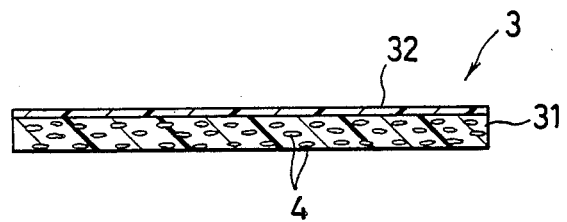
FIG. 3 is a vertical cross-sectional view illustrating an example of a drawn film layer containing voids and used for the flock sheet of the present invention.
Figure 4:
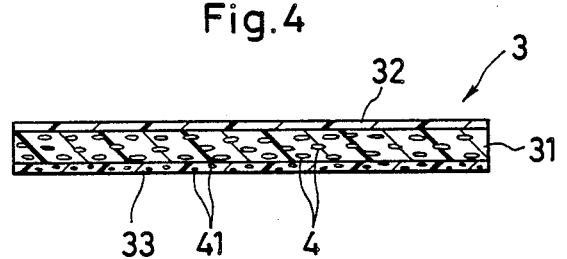
FIG. 4 is also a vertical cross-sectional view illustrating another example of a drawn film layer containing voids.
Figure 5:
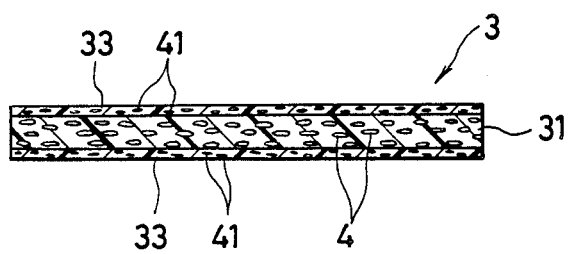
FIG. 5 is also a vertical cross-sectional view illustrating furthermore another example of a drawn film layer containing voids.

FIG. 3 illustrates one example of such a drawn film layer 3 where a thin film layer 32 having no voids is laminated on the side where a flock layer is to be laminated, of a main drawn film layer 31 having voids. When a flock layer 2 and a flexible sheet layer 7 are respectively provided on both faces of the drawn film layer as shown in FIG. 2A, it is desirable that, thin film layers 32 having no voids are respectively provided on both faces of the above described drawn film layer 31. Moreover, it is allowable that as the above described film layer, instead thereof, a film layer 33 having voids but whose content of voids is low is provided as shown in FIG. 4. Moreover, it is also allowable that these thin film layers 33 whose contents of voids are low are provided on the main drawn film layer 31 as shown in FIG. 5.

Such drawn film layers comprising a plurality of film layers can be prepared by extruding simultaneously a synthetic polymer containing fillers and another synthetic polymer containing no filler or reduced amounts of fillers in a stratified and composite film-like state from an extruder and drawing it. This film can also be obtained by a process where the described synthetic polymer containing fillers and synthetic polymer containing no filler or less amount fillers are respectively extruded from an individual extruder into a film-shape and drawn in the longitudinal direction and both films are laminated after this longitudinal drawing and simultaneously drawn in the transverse direction.

Uneven patterns given to the heat-resistant film layer can be formed based on the permanent strain generated when the drawn film layer is mechanically treated, as described above. To make shaping of the heat-resistant film layer easier, it is desirable that the thickness of the heat-resistant film layer is 1.0 times or less, preferably 0.05–0.6 times, more preferably 0.1–0.3 times the thickness of the drawn film layer. Moreover, the absolute value of the thickness of the heat-resistant film layer is not specifically restricted if the thickness satisfies the above described relation, but it is preferably in the range of 6–50 $\mu$m, more preferably in the range of 10–40 $\mu$m. To these values, the thickness of the drawn film layer is preferably in the range of 30–150 $\mu$m, more preferably 60–120 $\mu$m.

In the present invention, a flexible sheet layer is not always necessary, but if a flexible sheet is laminated, it is thereby possible to make processability of uneven patterns of the flock sheet. Moreover, it is possible to give excellent elasticity and good sewing characteristics which this flexible sheet layer possesses by laminating this flexible sheet layer. The thickness of this flexible sheet layer is preferably in the range of 20 $\mu$m–5 mm and is properly determined in accordance with the application of the flock sheet.

Types of the mechanical treatment which generate uneven patterns to the flock sheet are not specifically restricted. Mechanical treatments include the above described crumpling treatment, emboss treatment, and also crape treatment, pleat treatment and the like. On the flock sheet of the present invention, it is not always necessary to heat when this uneven pattern is treated. When heated on this uneven pattern treatment, it is desirable to heat at melting points or below the melting point of the synthetic polymer of the drawn film layer, preferably at the temperature at least 50° C. lower than the melting point. Especially, when the drawn film layer is constituted of polypropylene or its copolymer, the temperature is preferably in the range of from ambient temperature to 100° C.

To apply the uneven treatment on the flock sheet of the present invention, it may be possible to do after adhering the flock layer on the heat-resistant film layer, but it is also possible to do it before adhering the flock layer. In both cases, good uneven patterns can be shaped on the flock sheet. Especially, a leather-like appearances can be given on the surfaces of those flock sheets which are uneven-treated after adhering the flock layer.

Adhesives for bonding integrally each layer in the flock sheet of the present invention, are not specifically restricted. However, as adhesives for bonding the drawn film layer and the heat-resistant film layer, it is desirable to select an adhesive having good compatibility with both film layers so as to give sufficiently the uneven strain formed on the drawn film layer to the heat-resistant film layer. Such adhesives include synthetic resin adhesives such as polyurethanes, polyacrylics and so on. More concretely, reactive type or self-crosslinkable polyacrylate adhesives, thermosetting urethane adhesives, epoxy adhesives, rubber adhesives and so on can be used.

As described above, in heat-resistant flock sheets of the present invention, a heat-resistant film layer such as polyimide film and so on is used as the base material and it is possible to shape easily uneven patterns by laminating a drawn film layer containing voids and having good processability on the heat-resistant film layer.

EXAMPLE 1:

Pellets of polypropylene whose melt index defined by ASTM-D1238 was 1.0 and in which 20% by weight of calcium carbonate whose average particle size was 1.7 $\mu$m were added, and pellets of ethylene-propylene block copolymer whose ethylene component was 20% by weight were extruded from an extruder to prepare a double layer composite film, which was then biaxially drawn by 3.5 times in the longitudinal direction and by 9 times in the transverse direction and was heat-set and furthermore the surface of the film was treated by means of corona discharge treatment to obtain a composite biaxially drawn film whose thickness was about 60 $\mu$m. In the composite biaxially drawn film, the thickness of ethylene-propylene block copolymer film layer was 8 $\mu$m and the content of voids was 35% by volume.

Then, using the above described composite biaxially drawn film as a drawn film layer, a polyimide film ("Kapton" 100H manufactured by E.I. Du Pont de Nemours & Co., Inc.) whose thickness was 25 $\mu$m as a heat-resistant film layer was adhered on the side of the ethylene-propylene block copolymer layer side of the drawn film layer by using a polyurethane adhesive ("Seikabond" manufactured by Dainichi Seika Industries, Co., Ltd) to obtain a sheet I. Furthermore, in addition to this sheet I, a polyester/rayon blended fabric as a flexible sheet layer was further adhered on the side of the polypropylene layer containing voids of the above described drawn film layer to obtain another sheet II.

Polyacrylonitrile short fibers whose monofilament denier and fiber length were 9 denier and 0.8 mm respectively were electrically flocked on the surfaces of the heat-resistant film layers of the above described two sheets I and II by using a heat-curable polyurethane adhesive ("Seikabond" E260/C26 manufactured by Dainichi Seika Industries, Co., Ltd.) to obtain flock sheets III and IV where flock layers were thereby formed. Wrinkling and crumpling treatment was respectively carried out on the above described four kinds of sheets I, II, III and IV by the speed of 0.5 m/minute and at ambient temperatures by means of a Crumpling Machine Type YS manufactured by Yamasa Giken Co., Ltd. As a result, acute-angled and beautiful uneven patterns were given on each surface of the sheets.

Furthermore, the same polyacrylonitrile short fiber flock layer as described above was respectively further adhered on the above described uneven pattern-shaped sheets I and II, and sheets I' and II', wherein acute-shaped and beautiful uneven patterns were thereby formed along the above described uneven patterns were obtained.

On the other hand, a heat-resistant test and a flame resistant test of the above described sheets I', II', III, IV were conducted by bringing burning tobacco into contact with these flock layers for 3 minutes and observing their burning conditions. The flock layers of all the sheets contacted with burning tobacco were all charred, but the fires were extinguished without spreading.

EXAMPLE 2:

Pellets of polyethylene terephthalate dried at 180° C. for 3 hours under vacuum whose inherent viscosity (IV) is 0.6 were mixed with 20% by weight of pellets of polymethylpentene and the mixture was extruded into a film-shape at 270°–300° C. by means of an extruder and cooled and solidified. The extruded film was drawn 3 times in the longitudinal direction at 100° C. and furthermore drawn by 4 times in the transverse direction at 130° C. to obtain a biaxially drawn film whose thickness was 50 μm and which possessed content of voids of 32% by volume.

Then, the above described biaxially drawn film was used as the drawn film layer and a polyimide film ("Kapton" 100H manufactured by E.I. Du Pont de Nemours & Co., Inc.) whose thickness was 25 μm as a heat-resistant film layer was adhered on this drawn film layer by using a polyurethane adhesive ("Seikabond" manufactured by Dainichi Seika Industries, Co., Ltd.) to obtain a sheet V. Furthermore, in addition to this sheet V, a polyester/rayon blended fabric as a flexible sheet layer was adhered on the above described drawn film layer to obtain another sheet VI.

Aromatic polyamide short fibers whose monofilament denier and fiber length were 9 denier and 0.8 mm respectively were electrically flocked as flocked layers on the surfaces of the heat-resistant film layers of the above described sheet V and VI by using a heat-curable polyurethane adhesive ("Seikabond" E260/C26 manufactured by Dainichi Seika Industries, Co., Ltd.) to obtain flock sheets VII and VIII where flock layers were thereby formed.

Wrinkling and crumpling treatment was respectively carried out on the above described four kinds of sheets V, VI, VII and VIII by the speed of 0.5 m/minute and at ambient temperature by means of a Crumpling Machine Type YS manufactured by Yamasa Giken Co., Ltd. As a result, acute-angled and beautiful uneven patterns were given on each surface of the sheets.

Furthermore, the same aromatic polyamide short fiber flock layer as the above described one was respectively further adhered on the above described uneven pattern-shaped sheets V and VI, and sheets V' and VI' wherein acuted-shaped and beautiful uneven patterns were thereby formed along the above described uneven patterns were obtained.

On the other hand, a heat-resistant test and a flame resistant test of the above described sheets V', VI', VII and VIII were done by bringing burning tobacco into contact with these flock layers for 3 minutes and observing their burning conditions. The flock layers of all the sheets brought into contact with the burning tobacco were all charred, but the fires were extinguished without spreading.

EXAMPLE 3:

Except that an aromatic polyamide film ("TX" film manufactured by Toray Industries, Inc.) whose thickness was 12 μm instead of using the polyimide film whose thickness was 25 μm used as a heat-resistant film layer in Example 1, a sheet without flock and a flock sheet having the completely same make up as those in Example 1 were respectively prepared.

The same wrinkling and crumpling treatment, heat-resistant test and flame resistant test as those in Example 1 were conducted for each sheet and the same results as those obtained in Example 1 were obtained. Good uneven patterns are observed on all the sheets and good heat-resistance and flame-resistance were obtained.

COMPARATIVE EXAMPLE:

A polyester/rayon blended fabric as a flexible sheet layer was adhered on one face of a polyimide film ("Kapton" 100H manufactured by E.I. Du Pont de Nemours & Co., Inc.) whose thickness was 25 μm as a heat-resistant film layer by using a urethane adhesive ("Seikabond" E260/C26 manufactured by Dainichi Seika Industries, Co., Ltd.) to obtain a sheet IX.

Wrinkling and crumpling treatment was carried out on this sheet IX at a of 0.5 m/minute and at ambient temperature by means of a Crumpling Machine Type YS manufactured by Yamasa Giken Co., Ltd., but it was impossible to form uneven patterns on the surface of the sheet.

Furthermore, polyacrylonitrile short fibers whose monofilament denier was 9 denier and fiber length was 0.8 mm were electrically flocked as a flocked layer on the side of the heat-resistant film layer of the above described sheet IX by using a heat-curable polyurethane adhesive ("Seikabond" E260/C26 manufactured by Dainichi Seika Industries, Co., Ltd.) to obtain a flock sheet IX' where the flock layer was thereby formed.

The same wrinkling crumpling treatment was conducted on this flock sheet IX' by means of the same crumpling machine as the one described above, but it was impossible to give uneven patterns on the surface of the sheet.

What is claimed is:

1. A heat-resistant flock sheet comprising a heat-resistant film layer consisting of an unfusible organic polymer, a flock layer formed by flocking a plurality of short fibers on a surface of said heat-resistant film and a first adhesive layer positioned between the heat-resistant film and the flock layer; a drawn film layer containing a plurality of voids laminated on a surface of said heat-resistant film layer opposite to said flock layer and a second adhesive layer positioned between the heat-resistant film layer and the drawn film layer; said drawn film layer comprising a synthetic polymer having particulate fillers, and being drawn to form voids around the particulate fillers.

2. A heat-resistant flock sheet according to claim 1, further comprising a flexible sheet layer laminated on a surface opposite to said heat-resistant film layer of said drawn film layer.

3. A heat-resistant flock sheet according to claim 2, wherein said flexible sheet layer is selected from the group consisting of woven fabrics, knitted fabrics, nonwoven fabrics, papers, polymer films and polymer foam sheets.

4. A heat-resistant flock sheet according to claim 1, wherein said unfusible organic polymer forming said heat-resistant film layer is a polymer carbonized at 400° C. or higher.

5. A heat-resistant flock sheet according to claim 1, wherein said unfusible organic polymer forming said heat-resistant film layer is selected from polymers consisting of polyimide, aromatic polyamide, polyamideimide and polyparabanic acid.

6. A heat-resistant flock sheet according to claim 1, wherein the thickness of said heat-resistant film layer is 6–100 μm.

7. A heat-resistant flock sheet according to claim 1, wherein the thickness of said heat-resistant film layer is 1.0 time or less than the thickness of said drawn film layer.

8. A heat-resistant flock sheet according to claim 1, wherein a synthetic polymer forming said drawn film layer is selected from polymers consisting of polyolefins, polyesters and polyamides.

9. A heat-resistant flock sheet according to claim 1, wherein content of the voids in said drawn film layer is 25–60% by volume.

10. A heat-resistant flock sheet according to claim 1, wherein the filler is added to said drawn film layer in amounts of 10–40% by weight to said drawn film layer.

11. A heat-resistant flock sheet according to claim 1, wherein a portion of the voids inside said drawn film layer are squashed, and uneven patterns are formed on a surface of said drawn film layer.

12. A heat-resistant flock sheet according to claim 1, wherein said drawn film layer is a laminated film comprising at least one layer of drawn film containing voids and at least one layer of drawn film containing no voids.

13. A heat-resistant flock sheet according to claim 1, wherein said at least one drawn film layer is a laminated film comprising one layer of drawn film containing a plurality of voids and a drawn film containing a smaller amount of voids than present in said at least one layer of drawn films.

14. A heat-resistant flock sheet according to claim 1, wherein the flock of the flock sheet comprises monofilament denier and short fiber lengths in the ranges of 1–20 denier and 1–10 mm respectively.

* * * * *